(No Model.)
H. BRIGGS.
ANTIFRICTION BEARING.
No. 578,624. Patented Mar. 9, 1897.
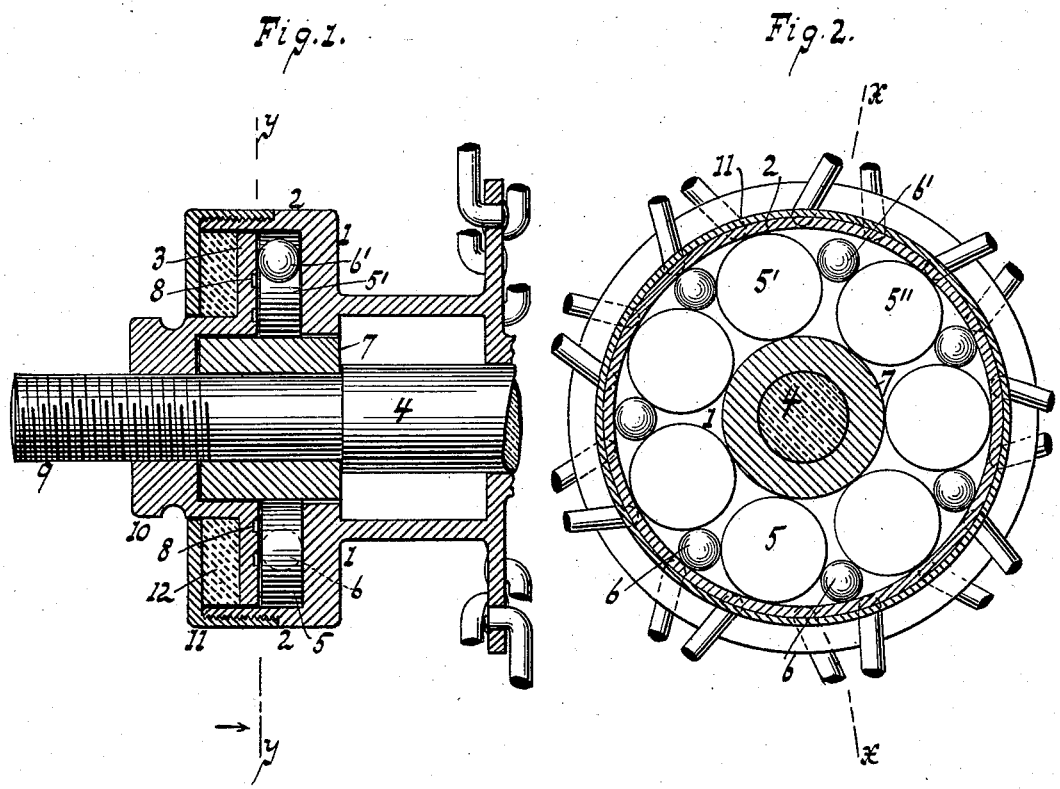
WITNESSES:
William Miller
Chas. E. Poensgen
INVENTOR
Henry Briggs.
BY
Hauff & Hauff,
ATTORNEYS

UNITED STATES PATENT OFFICE.

HENRY BRIGGS, OF HASBROUCK HEIGHTS, NEW JERSEY.

ANTIFRICTION-BEARING.

SPECIFICATION forming part of Letters Patent No. 578,624, dated March 9, 1897.

Application filed September 24, 1896. Serial No. 606,822. (No model.)

*To all whom it may concern:*

Be it known that I, HENRY BRIGGS, a citizen of the United States, residing at Hasbrouck Heights, in the county of Bergen and State of New Jersey, have invented new and useful Improvements in Antifriction-Bearings, of which the following is a specification.

The object of this invention is to obtain an antifriction-bearing which is readily constructed and easy of motion; and the invention resides in the novel features of construction set forth in the following specification and claims, and illustrated in the annexed drawings, in which—

Figure 1 is a section along line $x$ $x$, Fig. 2. Fig. 2 is a side elevation of the bearing sectioned along line $y$ $y$, Fig. 1.

The roller or ball race is formed by a box comprising a bottom or body 1 with wall 2 and cover or plate 3 for closing the box or hub. A shaft 4 is shown extending loosely through box-bottom 1, so that the box and shaft can rotate with respect to one another. Interposed between the shaft 4 or a collar 7, surrounding such shaft and box-wall 2, are disks or tablet-shaped rollers 5, and interposed between the disks are balls 6.

The diameter of the balls is shown smaller than the diameter of the disks, but such ball diameter is greater than the thickness or width of the disks, so that any end thrust is taken up by the balls bearing against box bottom 1 or cover 3. This diameter of the balls or the space between the box parts 1 and 3 should not be excessively larger than the thickness of the disks, so that the latter are prevented from assuming or dropping to a tilted or inclined or wedging position. By actual test it has been found that making the ball diameter seven one thousandths ($\frac{7}{1000}$) of an inch greater than the thickness of the disk is sufficent in practice.

The balls 6 by holding the disks 5 suitably apart or out of contact with one another will ease the travel of the disks or the friction between the latter. The box or its wall 2 is of such size or diameter as to allow the disks to separate sufficiently for the balls to be left free to pass away from or out of contact with the box-wall. By observing the movement of this device it has been noticed that all the balls but one run in contact with the box-wall, while as the disks successively come, for example, to the position of the disks 5' 5'', Fig. 2, such disks separate or spread to such a degree as to allow one ball after the other to temporarily drop or move or be pressed away from the box-wall 2, as in the case of ball 6', Fig. 2, while the other balls run in contact with such wall 2.

The balls are located at or in contact with the outer half of the disks, or, in other words, drawing a line through or connecting the centers of the several disks the ball centers will be located outside of such median line. Any pressure or movement tending to bring together two adjacent disks will tend to force the interposed ball against wall 2, and as one ball is always out of contact with such wall, as in the case of ball 6', such balls are prevented from grinding or remaining in constant contact with the box-wall 2.

The collar 7 surrounds or is removably fixed to shaft 4, so as to be interchangeable, but it is evident that the collar 7 can be omitted and the disks 5 can be interposed directly between shaft 4 and box or hub wall 2. Either the cover 3 or box-bottom 1, or both, may be grooved or recessed, as at 8, said recess or recesses 8 forming a chamber or chambers for storing oil or lubricant. The shaft 4 is shown threaded, as at 9, to receive the screw-head or tapped part 10 of cover 3. A dust-cap 11, threaded or secured to box or hub wall 2, can also be provided, and a washer 12, interposed between cap 11 and cover 3, aids in securing tight closure.

It is important that the diameters of the balls 6 be greater than the thickness of the disks 5, as this construction prevents contact between the flat faces of the disks and the race-bottom 1 and cover 3. As the balls are in the form of spheres they run easily and with the least possible contact with the bottom 1 and cover 3, as well as with the race-wall 2 and the disks 5. If cylindrical rollers were used instead of the balls or spheres, such rollers would offer greatly-increased surface contact with the disks, and the flattened ends of the rollers would constantly grind against the inner surfaces of the bottom 1 and cover 3. Moreover, as the cylindrical rollers can only rotate in one direction or about axes parallel to the axes of rotation of the disks 5, the rollers would not possess the necessary freedom of play in reducing friction as is the case with the balls or spheres.

In the construction illustrated in the drawings a vertical thrust or a thrust at right angles to the shaft 4 is properly resisted by the disks 5, and an end thrust or a thrust parallel to the axis of the shaft 4 is properly resisted by the balls or spheres 6. This is very important, particularly in pedaling bicycles, as, for instance, when the pedal or crank is at its highest point a pressure of the foot downward on the pedal exerts a partly lateral or end thrust or pressure on the shaft, which is relieved by the balls or spheres.

What I claim as new, and desire to secure by Letters Patent, is—

1. An antifriction-bearing comprising a box or race, a shaft in the box, disks interposed between the shaft and box-wall, and balls interposed between the disks, said disks being of less width than the diameter of the balls and the race having its top and bottom constructed to snugly contain and guide the balls while maintaining the flat faces of the disks free from contact with said top and bottom, substantially as described.

2. An antifriction-bearing comprising a box or race, a shaft in the box, disks interposed between the shaft and box-wall, and balls interposed between the disks and located at the outer half of the disks, said balls being of greater diameter than the width of the disks and arranged to ease rotation and reduce friction during end thrusts, and said disks being arranged to ease rotation and reduce friction during vertical thrusts, substantially as described.

In testimony whereof I have hereunto set my hand in the presence of two subscribing witnesses.

HENRY BRIGGS.

Witnesses:
 WM. C. HAUFF,
 E. F. KASTENHUBER.